US010509925B2

(12) United States Patent
Sardaryan et al.

(10) Patent No.: US 10,509,925 B2
(45) Date of Patent: Dec. 17, 2019

(54) CIRCUIT BOARD ENCLOSURE AND METHOD FOR COMMUNICATIONS APPLICATIONS

(71) Applicant: LDA Technologies Ltd., Mississauga (CA)

(72) Inventors: Sergey Sardaryan, Mississauga (CA); Mariya Sukiasyan, Mississauga (CA); Vahan Sardaryan, Hinsdale, IL (US)

(73) Assignee: LDA TECHNOLOGIES LTD., Mississauga (CA)

( * ) Notice: Subject to any disclaimer, the term of this patent is extended or adjusted under 35 U.S.C. 154(b) by 11 days.

(21) Appl. No.: 15/493,614

(22) Filed: Apr. 21, 2017

(65) Prior Publication Data

US 2017/0308725 A1    Oct. 26, 2017

Related U.S. Application Data

(60) Provisional application No. 62/325,614, filed on Apr. 21, 2016, provisional application No. 62/325,645, filed on Apr. 21, 2016.

(51) Int. Cl.
| G06K 7/06 | (2006.01) |
| G06K 7/04 | (2006.01) |
| G06K 19/077 | (2006.01) |
| G06F 1/08 | (2006.01) |
| G06F 13/40 | (2006.01) |
| G06F 13/42 | (2006.01) |

(52) U.S. Cl.
CPC .............. *G06K 7/042* (2013.01); *G06F 1/08* (2013.01); *G06F 13/4022* (2013.01); *G06F 13/4068* (2013.01); *G06F 13/4282* (2013.01); *G06K 19/07732* (2013.01); *G06F 2213/0026* (2013.01)

(58) Field of Classification Search
CPC ............... G06K 7/042; G06K 19/0772; G06F 13/4282; G06F 13/4068; G06F 2213/0026
USPC ................................... 235/441, 439
See application file for complete search history.

(56) References Cited

U.S. PATENT DOCUMENTS

| 6,779,734 B2 * | 8/2004 | Hill ...................... G06K 19/07 235/441 |
| 8,157,180 B2 * | 4/2012 | Cho ..................... G06K 7/0008 235/375 |
| 8,186,600 B2 * | 5/2012 | Cho .................. G06K 19/07769 235/440 |
| 2002/0011516 A1 * | 1/2002 | Lee ...................... G06F 3/0227 235/380 |

* cited by examiner

*Primary Examiner* — Daniel St Cyr
(74) *Attorney, Agent, or Firm* — Bereskin & Parr LLP/S.E.N.C.R.L., s.r.l.

(57) ABSTRACT

A data card enclosure method and system comprising data card connectors and host interface connectors on a data card housed in the data card enclosure. The data card enclosure method and system provided for connecting the data card connectors and host interface connectors to external communications ports.

20 Claims, 18 Drawing Sheets

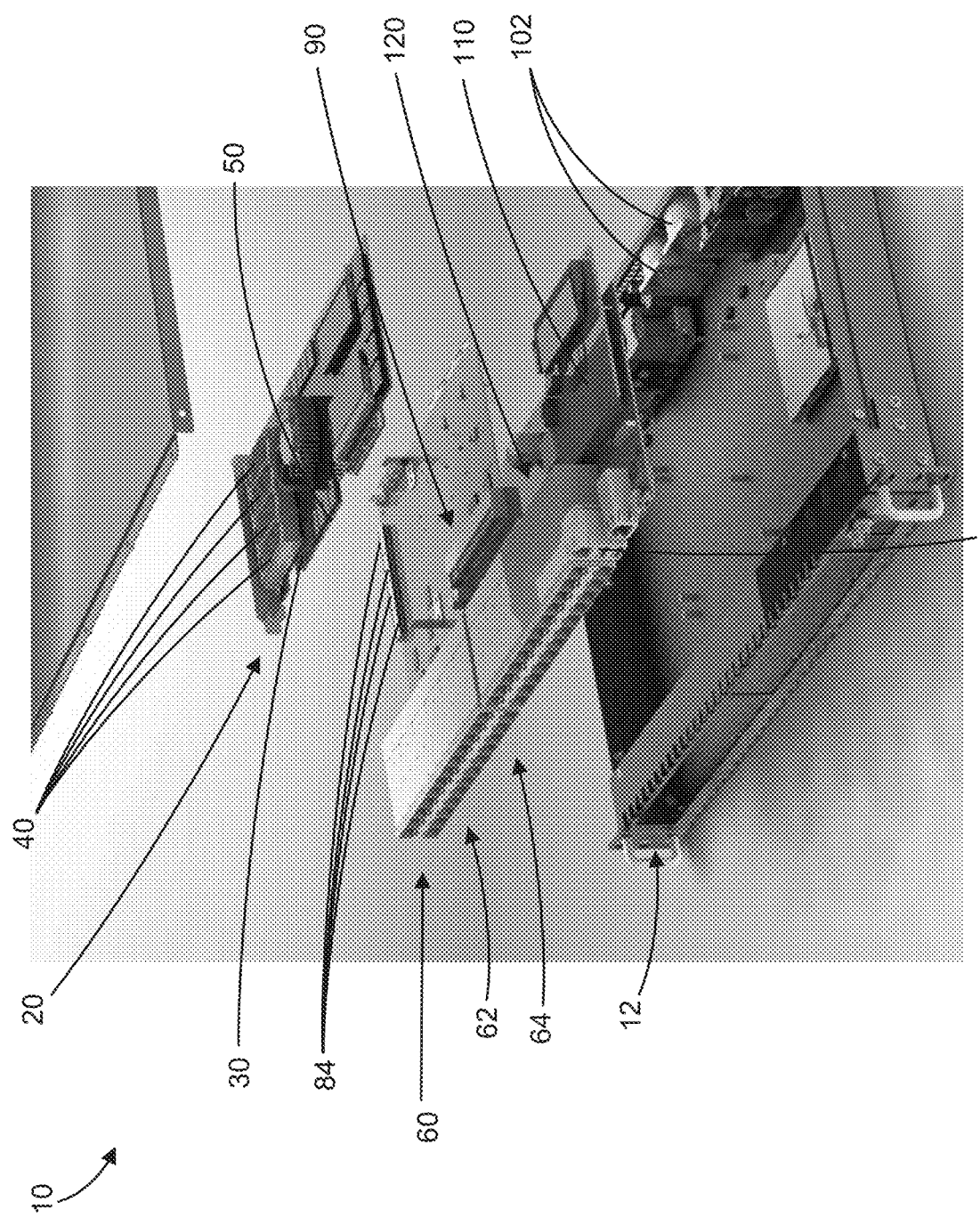

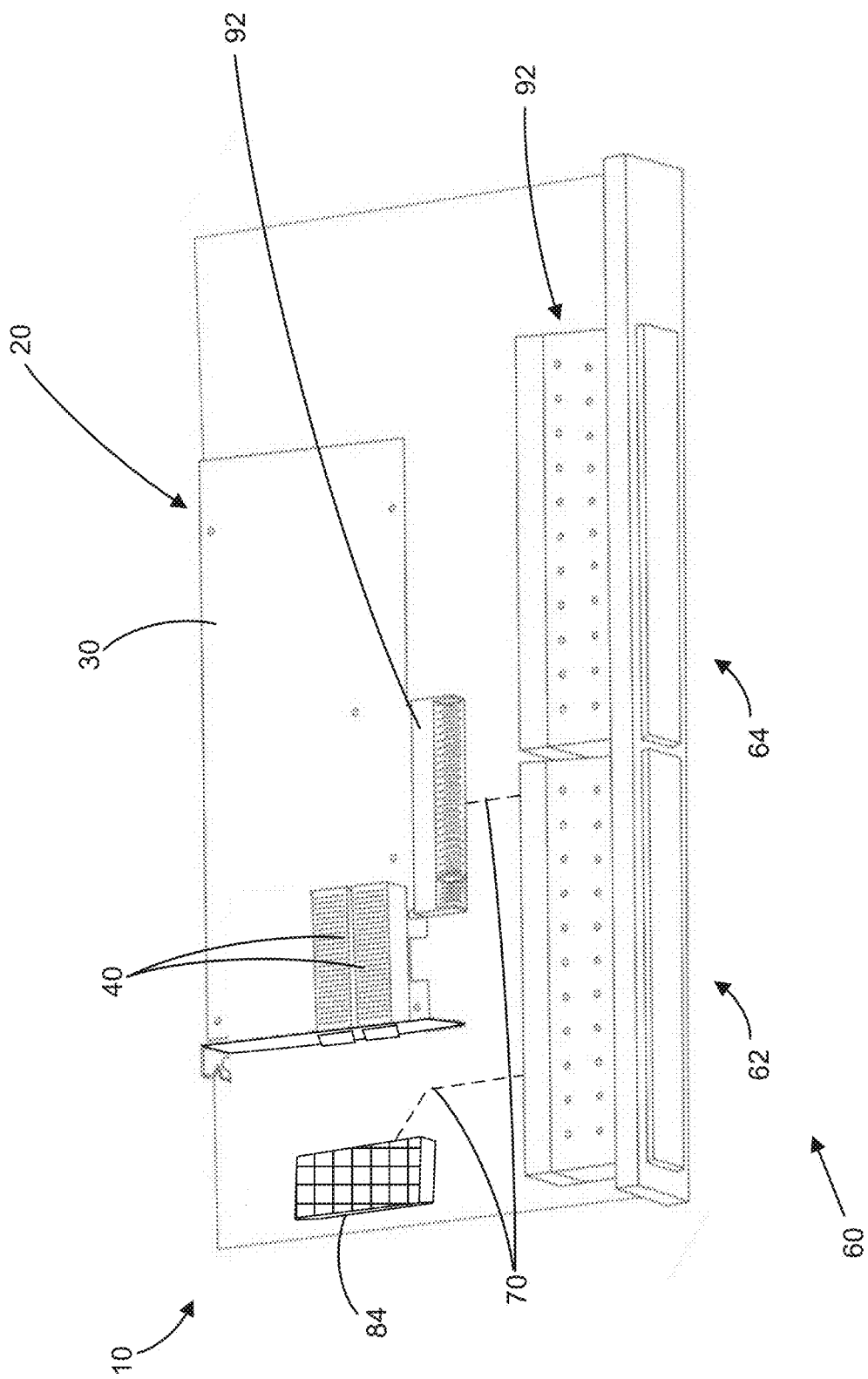

FIGURE 12

```
LDA-B4>show interface p1-16 transceiver

Port    Manufacturer    Model            Speed      Connector
Name                                     (Mbit/s)   Type p1      FINISAR CORP.   FTLX8571D3BCL-BM 10800      LC
p2      FINISAR CORP.   FTLX8571D3BNL-E5 10800      LC
p3      FINISAR CORP.   FTLX8571D3BNL-E5 10800      LC
p4      FINISAR CORP.   FTLX8571D3BCL-BM 10800      LC

LDA-B4>
```

FIGURE 13

CIRCUIT BOARD ENCLOSURE AND METHOD FOR COMMUNICATIONS APPLICATIONS

RELATED APPLICATIONS

This application claims priority from the U.S. provisional patent application Nos. 62/325,614, filed on Apr. 21, 2016 entitled "CIRCUIT BOARD ENCLOSURE FOR COMMUNICATIONS APPLICATIONS"; and 62/325,645, filed on Apr. 21, 2016 entitled "SYSTEM AND METHOD TO REPURPOSE COMMUNICATION PORTS", the disclosures of which are incorporated herein, in their entirety, by reference.

FIELD

The described embodiments and aspects relate to apparatus and methods for circuit board enclosures, and in particular, to circuit board enclosures for hosting a data card.

BACKGROUND

Data cards, such as those containing Field Programmable Gate Array (FPGA) devices, may be used in various applications including networking applications.

Data cards may be provided in the form of a computer expansion card, and may include PCI-Express or PCIe compliant bus interface pluggable into the motherboard of a computer for power and data exchange. These boards may include a number of input and output connections, including host interface edge connectors and physical communication interfaces such as RJ45 Ethernet and connectors for Quad Small Form-factor Pluggable (QSFP) transceivers for high speed serial data links to other nodes within a network (e.g. switch, router, server, etc.).

In some applications, data cards may be housed or deployed in rackmount compatible or "rackable" servers within a data center. When data cards are housed or deployed in rackmount compatible or "rackable" servers, currently employed data cards designs may not provide easy access to all available connections on the data cards.

SUMMARY

In an embodiment of the present invention there is a data card enclosure system for hosting a data card, the data card having a printed circuit board with a plurality of data card connectors and a plurality of host interface connectors disposed thereon, wherein the plurality of host interface connectors are configured to interface with an internal data bus of a host computer system to transfer data between the data card and host computer system, the data card enclosure system comprising an enclosure housing defining an interior space for housing the data card; a plurality of external communication ports on an exterior of the enclosure, such that the plurality of external communication ports is accessible by a user of the data card without accessing the interior space of the enclosure and the data card housed therein; and a plurality of electrical connections for connecting the plurality of data card connectors and the plurality of host interface connectors to the plurality of external communication ports, the plurality of electrical connections comprising a first plurality of electronic couplings of a first kind of electronic coupling for connecting to the plurality of data card connectors, and a second plurality of electronic couplings of a second kind of electronic coupling for connecting to the plurality of host interface connectors, the first kind of electronic coupling being different from the second kind of electronic coupling.

In an embodiment of the present invention, the plurality of host interface connectors project from a surface of an edge of the printed circuit board, to define data card edge connectors with a plurality of electronic contact surfaces and a plurality of connector positioning surfaces; the enclosure housing comprises at least one card receptacle for receiving the plurality of host interface connectors, the at least one card receptacle comprising the second plurality of electronic couplings of the second kind of electronic coupling, the second plurality of electronic couplings comprising a plurality of matching electronic contact surfaces for contacting the plurality of electronic contact surfaces of the plurality of host interface connectors when the plurality of host interface connectors is received into the at least one card receptacle; and the enclosure housing further comprises a plurality of enclosure positioning surfaces for contacting the plurality of connector positioning surfaces to position the plurality of host interface connectors relative to the enclosure housing such that the plurality of electronic contact surfaces of the plurality of host interface connectors contact the matching electronic contact surfaces of the second plurality of electronic couplings.

In an embodiment of the present invention, the first plurality of electronic couplings is configured to be releasably attachable to the plurality of data card connectors; and the plurality of electrical connections comprises a plurality of electrical cables, each cable in the plurality of electrical cables having at least one corresponding electronic coupling in the first plurality of electronic couplings for coupling that cable to at least one corresponding connector in the plurality of data card connectors.

In an embodiment of the present invention, the receptacle comprising the second plurality of electronic couplings of the second kind of electronic coupling and enclosure positioning surfaces establishes a PCI Express-compliant interface for receiving a PCI Express-compliant data card.

In an embodiment of the present invention, the data card enclosure system further comprises a signal conditioning system, the signal conditioning system being electrically coupled to the plurality of external communication ports for maintaining compliance of electrical signals within the plurality of electrical connections to a signalling standard, the signalling standard specifying at least a threshold signal amplitude and a signal to noise ratio.

In an embodiment of the present invention, the plurality of external communication ports comprises a first set of external communication ports and a second set of external communication ports, the first set of external communication ports being operable to communicate at a first maximum bit-rate that is greater than a second maximum bit-rate of the second set of external communication ports.

In an embodiment of the present invention, the data card enclosure system further comprises a host data processor coupled to the plurality of external communication ports and operable to monitor, for each external communication port in the plurality of external communication ports, a status of that external communication port, the status indicating at least i) a bit-rate of that external communication port; ii) at least one connector in the plurality of data card connectors and plurality of host interface connectors to which that external communication port is connected; and iii) a type of an external connector coupled to that external communication port.

In an embodiment of the present invention, the host data processor is further operable to provide a user interface for representing the plurality of external communication ports and for indicating, for each external communication port, the status of that external communication port to the user of the data card.

In an embodiment of the present invention, the data card enclosure further comprises at least one host data processor interface connector provided on the exterior of the enclosure for the user of the data card to communicate with the host data processor.

In an embodiment of the present invention, the data card enclosure further comprises an air circulation system having at least one fan to circulate air through the interior space of the enclosure and temperature sensor to measure a temperature value within the interior space occupied by the data card, each fan being controllable by the host data processor to adjust a rotational speed of a set of fan blades of that fan based on the temperature value measured by the at least one temperature sensor and provided to the host data processor.

In an embodiment of the present invention, the data card enclosure further comprises at least one switch fabric coupled to the plurality of external communication ports and the plurality of data card connectors and host interface connectors, the switch fabric being configurable by the host data processor to map at least one connector in the plurality of data card connectors and host interface connectors to at least one external communication port by establishing an electronic communication pathway from the at least one connector in the plurality of data card connectors and host interface connectors to at least one external communication port using the plurality of electrical connections.

In an embodiment of the present invention, the at least one switch fabric comprises a plurality of sub switch fabrics, each sub switch fabric operates independently of each other sub switch fabric and is operable to transfer electrical signals between a corresponding subset of external communication ports and a subset of connectors in the plurality of data card connectors and plurality of host interface connectors In an embodiment of the present invention, a switch fabric is operable to transfer data at a first maximum bit-rate that is greater than a second maximum bit-rate of a second switch fabric.

In an embodiment of the present invention, the data card enclosure system further comprises the data card having the printed circuit board with the plurality of data card connectors and the plurality of host interface connectors disposed thereon housed within the interior space defined by the enclosure housing, wherein the plurality of electrical connections are connected to the plurality of data card connectors and to the plurality of host interface connectors, the plurality of electrical connections being connected to the plurality of data card connectors by the first plurality of electronic couplings and to the plurality of host interface connectors by the second plurality of electronic couplings, to transfer data between the data card and the plurality of external communication ports via the plurality of electrical connections In accordance with an aspect of an embodiment of the present invention there is provided a method of using a data card including a printed circuit board, the method comprising providing the data card, the data card having a plurality of communication ports available on the data card, wherein, the plurality of communication ports are disposed on the printed circuit board of the data card and comprise a plurality of data card connectors and a plurality of host interface connectors, the plurality of host interface connectors being configured to interface with an internal data bus of a host computer system to transfer data between the data card and the host computer system; providing an enclosure housing defining an interior space for housing the data card; providing a plurality of external communication ports on an exterior of the enclosure, such that the plurality of external communication ports is accessible by a user of the data card without accessing the interior space of the enclosure and the data card housed therein; and, providing a plurality of electrical connections in the enclosure by, for each communication port in the plurality of communication ports, providing a corresponding electrical connection in the plurality of electrical connections for connecting that communication port to a corresponding external communication port on the exterior of the enclosure.

In an embodiment of the present invention, the method further comprises monitoring a status of each of the external communication port, the status indicating at least i) a bit-rate of that external communication port; ii) at least one connector identifier identifying at least one connector in the plurality of data card connectors and plurality of host interface connectors to which that external communication port is connected; and iii) a type of an external connector coupled to that external communication port; providing a user interface representing at least one of the plurality of external communication ports; and displaying, for each external communication port represented in the user interface, the status of that external communication port.

In an embodiment of the present invention, the method further comprises assigning, to each external communication port in the plurality of external communication ports, an external communication port identifier; assigning, to each connector in the plurality of card connectors and plurality of host interface connectors, a data card connector identifier; and providing a default port mapping configuration, the default port mapping configuration specifies, using assigned data card connector identifiers and external communication port identifiers, establishment of an electronic communication pathway from a connector in the plurality of data card connectors and host interface connectors to an external communication port using an electrical connection in the plurality of electrical connections, in which respective identifiers of the connector and the external communication port are paired based on a default mapping.

In an embodiment of the present invention, the method further comprises operating a host data processor to provide a user interface to receive at least one input from a user of the data card to specify a user-defined port mapping configuration, the user-defined port mapping configuration replaces the default port mapping configuration and specifies, using the assigned data card connector identifiers and external communication port identifiers, establishment of at least one customized port mappings that define user-defined electronic communication pathway from a user-selected connector in the plurality of data card connectors and host interface connectors to a user-selected external communication port using an electrical connection in the plurality of electrical connections in which respective identifiers of the user-selected connector and user-selected port are different from port mappings associated with the default port mapping configuration.

In an embodiment of the present invention, the method further comprises determining an interface standard with which the host interface connectors of the data card are compliant and providing a compatible data card receptacle for receiving the plurality of host interface connectors within the enclosure.

In an embodiment of the present invention, the method further comprises communicating with a data card processor of the data card housed in the interior space of the enclosure by sending and receiving electrical signals using the plurality of external communication ports, the electrical signals being propagated along the plurality of electrical connections, and the plurality of host interface connectors and plurality of data card connectors to the data card.

These and other embodiments of the invention may be more readily understood with the aid of the illustrative Figures and detailed description included below.

BRIEF DESCRIPTION OF THE DRAWINGS

Embodiments of the present invention will now be described in detail with reference to the figures, in which:

FIG. 1B is an exploded view of the circuit board enclosure of FIG. 1A according to an aspect of the present invention;

FIG. 3A is a top view of a circuit board enclosure according to an aspect of the present invention;

FIG. 12 is a depiction of a portion of a user interface according to an aspect of the present invention;

FIG. 13 is a depiction of a portion of a user interface according to an aspect of the present invention;

DETAILED DESCRIPTION OF EXEMPLARY EMBODIMENTS AND ASPECTS

Figure 1A:
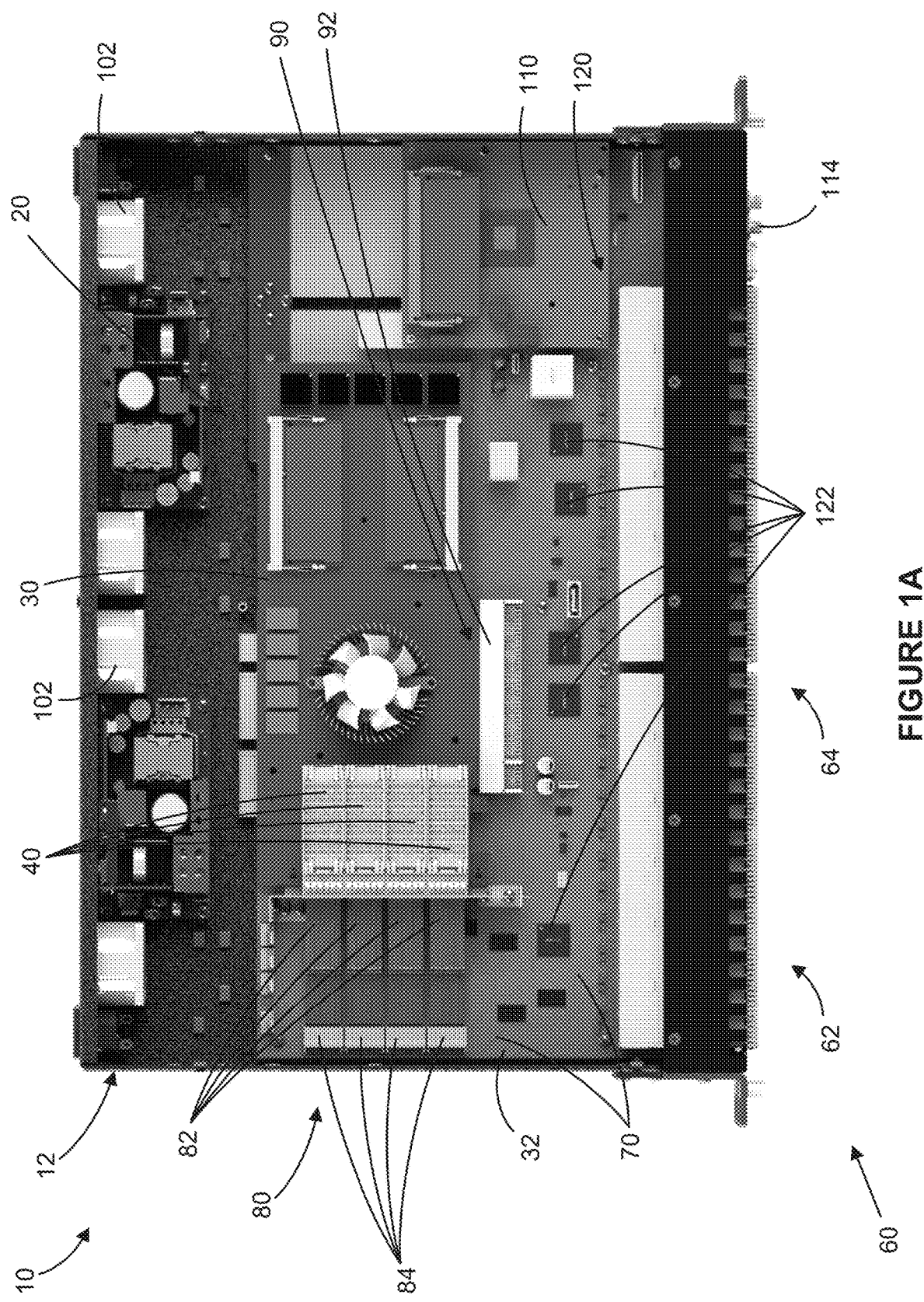
FIG. 1A is a top view of a circuit board enclosure hosting a data card according to an aspect of the present invention.

The embodiments and aspects of the systems and methods described herein may be implemented in hardware or software, or a combination of both. Some embodiments and aspects may be implemented in, or may interface with, computer programs executing on programmable computers, each computer including at least one processor, a data storage system (including volatile memory or non-volatile memory or other data storage elements or a combination thereof), and at least one communication interface.

Program code may be applied to data to perform the functions described herein and to generate information. The information may be applied to one or more devices, in known fashion.

Some embodiments and aspects may be implemented in a high level procedural or object oriented programming or scripting language, or both, to communicate with a computer system. Alternatively, some embodiments and aspects may be implemented in assembly or machine language, if desired. The language may be a compiled or interpreted language. Each such embodiment and aspect may be stored on a storage media or a device (e.g., ROM, magnetic disk, optical disc), readable by a general or special purpose programmable computer, for configuring and operating the computer when the storage media or device is read by the computer to perform the procedures described herein. Embodiments and aspects of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments and aspects may be distributed in a computer program product including a physical, non-transitory computer readable medium that bears computer usable instructions for one or more processors. The medium may be provided in various forms, including one or more diskettes, compact disks, tapes, chips, magnetic and electronic storage media, and the like. Non-transitory computer-readable media comprise all computer-readable media, with the exception being a transitory, propagating signal. The term non-transitory is not intended to exclude computer readable media such as a volatile memory or RAM, where the data stored thereon is only temporarily stored. The computer useable instructions may also be in various forms, including compiled and non-compiled code.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments and aspects described herein. However, it will be understood by those of ordinary skill in the art that the embodiments and aspects described herein may be practiced without these specific details. In other instances, well-known methods, procedures and components have not been described in detail so as not to obscure the embodiments and aspects described herein. Also, this description and the drawings are not to be considered as limiting the scope of the embodiments and aspects described herein in any way, but rather as merely describing an implementation of the various embodiments and aspects described herein.

Specific embodiments and aspects of the invention will now be described with reference to FIGS. 1 to 8.

Reference is now made to FIGS. 1 to 8, in which a data card enclosure 10 is depicted in accordance with an aspect of an embodiment of the present invention. Data card enclosure 10 comprises a data card enclosure housing 12, defining an interior space.

The data card enclosure housing 12 can house a data card 20. The data card 20 may be a computer expansion card connectable to an expansion slot provided by the motherboard of a computer. The data card generally comprises a printed circuit board (PCB) 30, with various components such as input/output interfaces, memory, and processors. For example, in the present case, the processor of the data card 20 may be a field programmable gate array (FPGA). The printed circuit board has disposed thereon data card connections 40 and host interface connections 50. The host interface connectors 50 can be configured to interface with an internal data bus of a host computer system to transfer data between the data card and host computer system. In the case of a computer expansion card, the host interface connector may be the edge connectors of the expansion card for interfacing with the computer (i.e. the host). The data card connectors can be all other connectors and interfaces disposed on the data card to which cabling with the appropriate plugs may be used to connect to the data card connectors.

Figure 8:
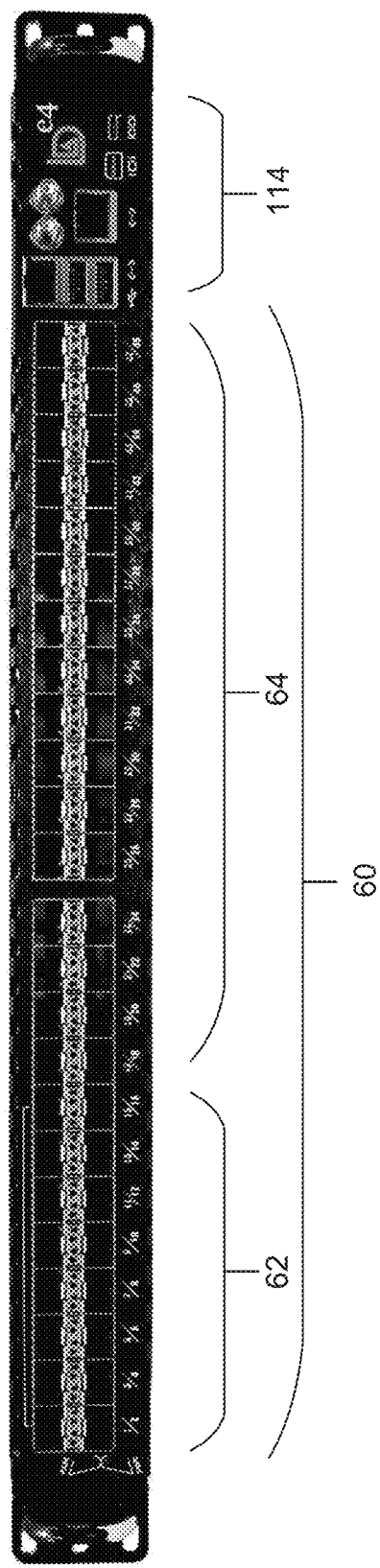
FIG. 8 is a front view of a circuit board enclosure front panel according to an aspect of the present invention.

The data card enclosure 10 also comprises external communications ports 60. The ports may be disposed on an external panel for ease of access. For example, as shown in FIG. 8, the external communication interfaces 60 may be provided on the front panel of the enclosure. The plurality of external communication ports 60 can be accessible by a user of the data card 20 to access resources (physical or electronic) on the data card without accessing the interior space of the data card enclosure and the data card 20 housed therein.

The External communication ports 60 may provide a user with easier access to the connections available on a data card 20. Particularly, when the data card is hosted on the back of a rackable server, access to the ports of the data card may be restricted. For example, access to the host interface connectors (e.g. the edge connectors of the data card) may be restricted. Externally accessible ports such as the external communication ports 60 may be linked to the data card connectors and data card host connectors to provide access to internally available links. For instance, if the data card is a PCI Express-compliant FPGA card, the PCI Express links provided on the edge connectors, which otherwise might not be available for use, can be made accessible and thus usable by a user of the data card.

For the purposes of this disclosure the term "accessible" can be understood to mean physical access, such as having an electrical connection between an outside device or user to a resource on the data card such as a data card connector. Access may also mean having access to the resources provided on the data card, which includes the ability to read/write data stored on the memory that may be provided on the data card or to interact with computational resources such as a processor or programmable logic available on the data card.

The data card enclosure 10 can further comprise a plurality of electrical connections 70, such as signaling traces on a printed circuit board, for connecting the data card connections 40 and the host interface connections 50 to the external communications ports 60.

The electrical connections 70 can comprise a first kind of electrical coupling 80 and a second kind of electrical coupling 90. In the present embodiment, the first kind of electrical coupling 80 can be provided to couple the data card connections 40 to the external communications ports. The second kind of electrical coupling 90 can be provided to couple the host interface connections 50 to the external communications ports.

Figure 2:
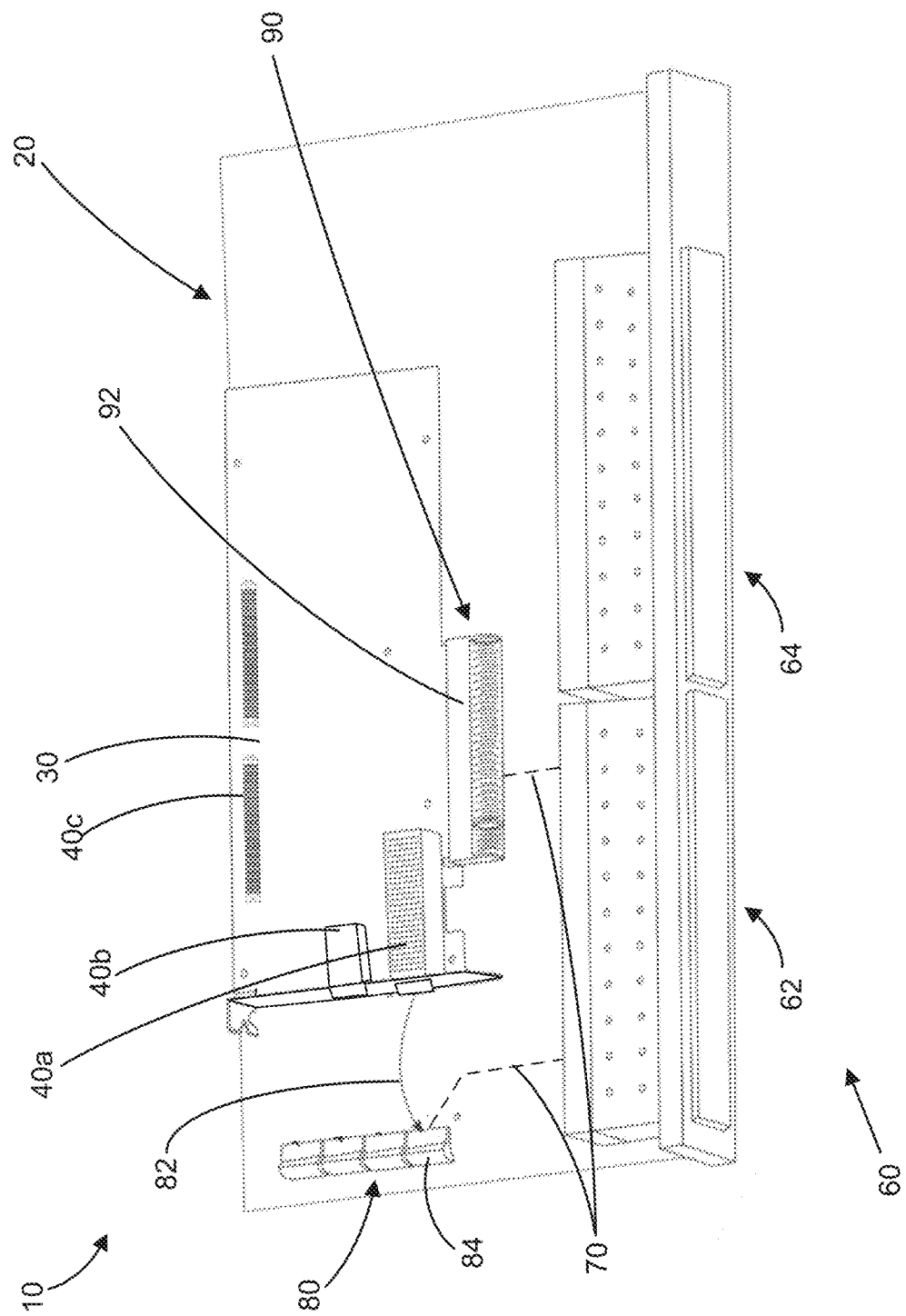
FIG. 2 is a perspective view of a circuit board enclosure of FIG. 1A hosting a differently configured data card according to an aspect of the present invention.

The first kind of electrical coupling 80 can include cabling 82 for connecting data card connectors 40 to terminating connections 84. As depicted in FIG. 1A and FIG. 2, the data card of FIG. 1A includes a number of QSFP high-speed serial interfaces 40 while the data card of FIG. 2 has a single QSFP interface 40a. For connecting to these interfaces, cables 82 may be provided to connect each interface 40 and 40a of FIG. 1a and FIG. 2, respectively, to a corresponding electronic terminating connection 84 on the enclosure. As shown in FIG. 1A, four data cables can be used to connect the four QSFP interfaces 40 to the enclosure. In FIG. 2, a single data cable is used to connect the single QSFP interface 40a to the enclosure.

Figure 3B:
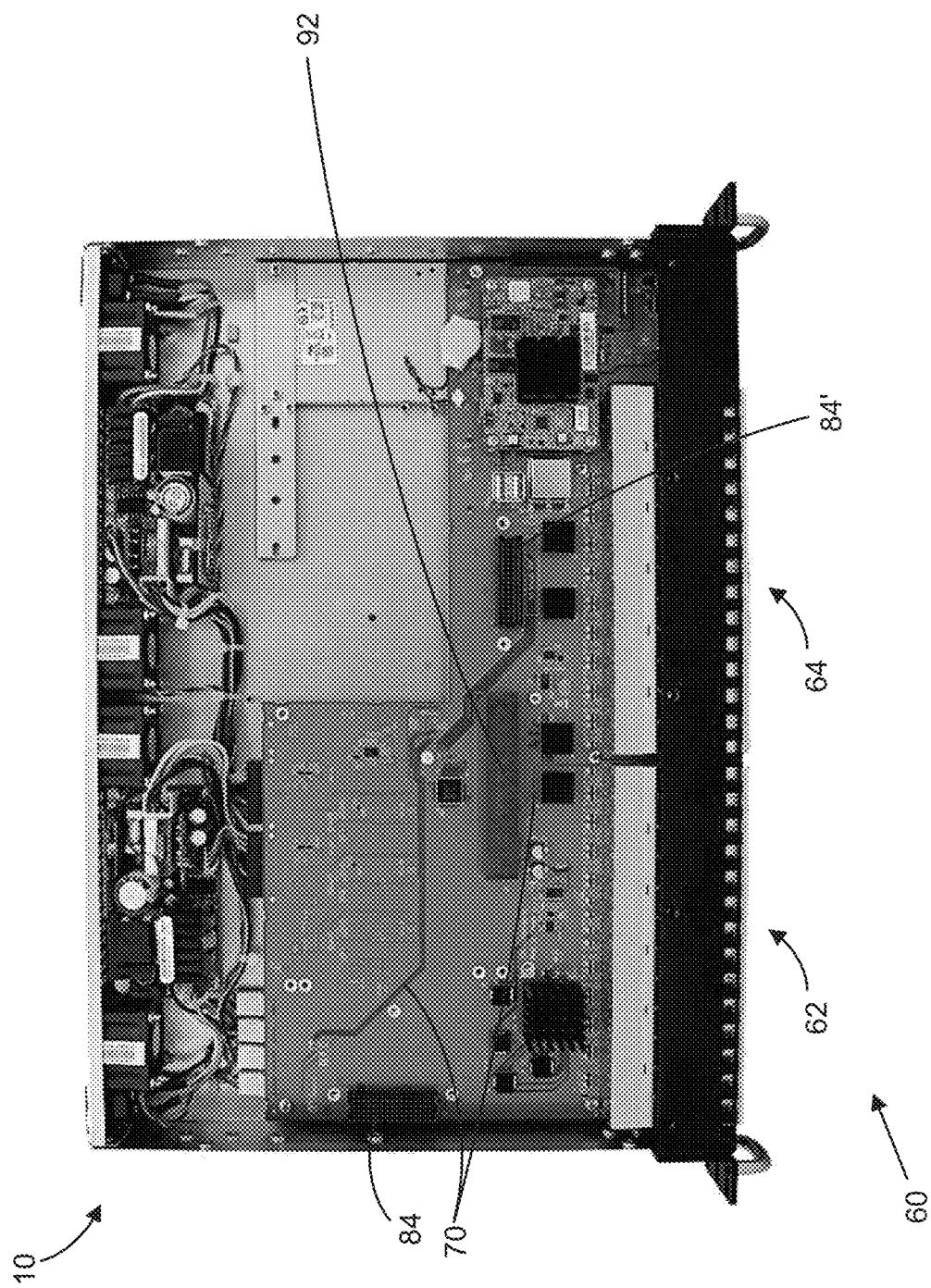
FIG. 3B is a top view of a photo of a circuit board enclosure with horizontal and vertical connectors according to an aspect of the present invention.
Figure 4:
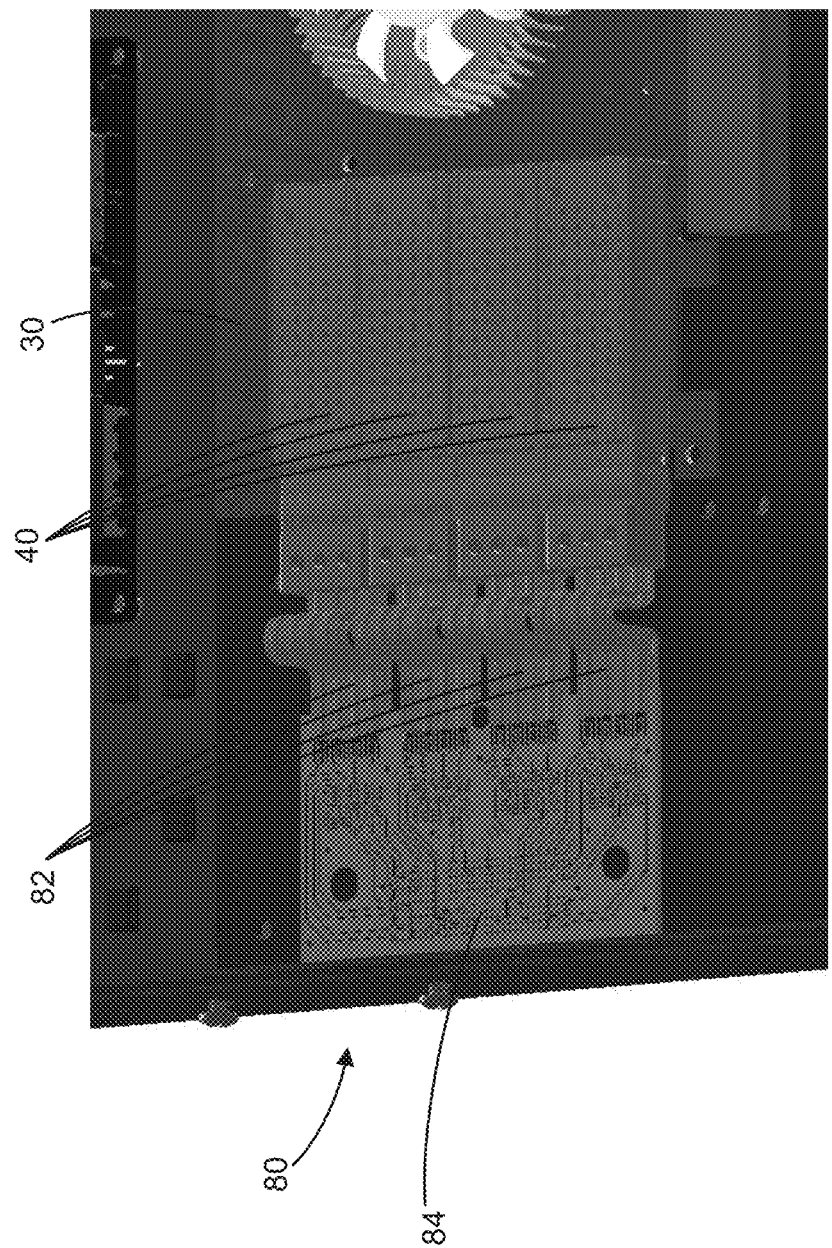
FIG. 4 is a perspective view of a section of a data cable and connector for the circuit board enclosure of FIG. 3 according to an aspect of the present invention.

In some other embodiments the cabling 82 may connect unequal numbers of terminating connections and data card connections. An example is depicted in FIG. 4, in which cabling 82 connects four data card connections 40 (e.g. QSFP interfaces) with a single terminating connection 84. FIG. 3 shows the single terminating connection 84 having electrical contacts for receiving electrical connections from multiple cables.

In yet other embodiments cabling 82 may include other types of cabling including custom cabling for connecting to various types of interfaces on the data card. The first kind of electrical coupling 80 may comprise couplers to couple to at least one of a multiline transceiver interface, such as Quad Small Form-factor Pluggable interface, as noted above, small form-factor pluggable interface (SFP), and proprietary user interface, among others.

The first kind of electrical coupling 80 may be connectors that are releasably attachable to the plurality of data card connectors 40. For example as depicted in the embodiment of FIG. 2, a data card 20 may comprise multiple types of interfaces for providing data card connections. As shown in FIG. 2, data card 20 comprises small form factor (SFP) connections 40a, Universal Serial Bus (USB) connectors 40b, and FPGA Mezzanine Card (FMC) connectors 40c. In each case, the data card connections may be connected to the external communications ports 60 by means of the electrical connections 70 using the first kind of electronic couplings 80. Specifically, the first kind of electronic couplings 80 comprise electrical cables 82 and terminating connectors 84, and an appropriate coupler to mate with the appropriate data card connector 40a, 40b and 40c (e.g. USB, FMC, SFP etc) provided on the data card to connect the data card connectors 40a, 40b, and 40c to traces on the motherboard 32, which are provided to link the data card connections to the external communications ports 60.

In the embodiment depicted in FIG. 2, the enclosure 10 comprises a single terminating connector 84 connected to a single SFP connection 40a by a single cable 82. However, In FIG. 3A the enclosure 10 comprises a single terminating connection 84 provided to connect by means of cabling to multiple card connections 40 (in the present case, two connectors). As mentioned above, in other embodiments other ratios of data card connectors to terminating connectors may be used with various cabling configurations. In FIG. 3B, the enclosure (without data card installed) 10 comprises two terminating connections, a vertically oriented terminating connection 84 and a horizontally oriented terminating connection 84'. In this configuration, the vertical terminating connection 84 may be connected to a first set of external communication ports 62 and the horizontal terminating connection 84' may be connected to the second set of external communication ports 64.

Figure 5:
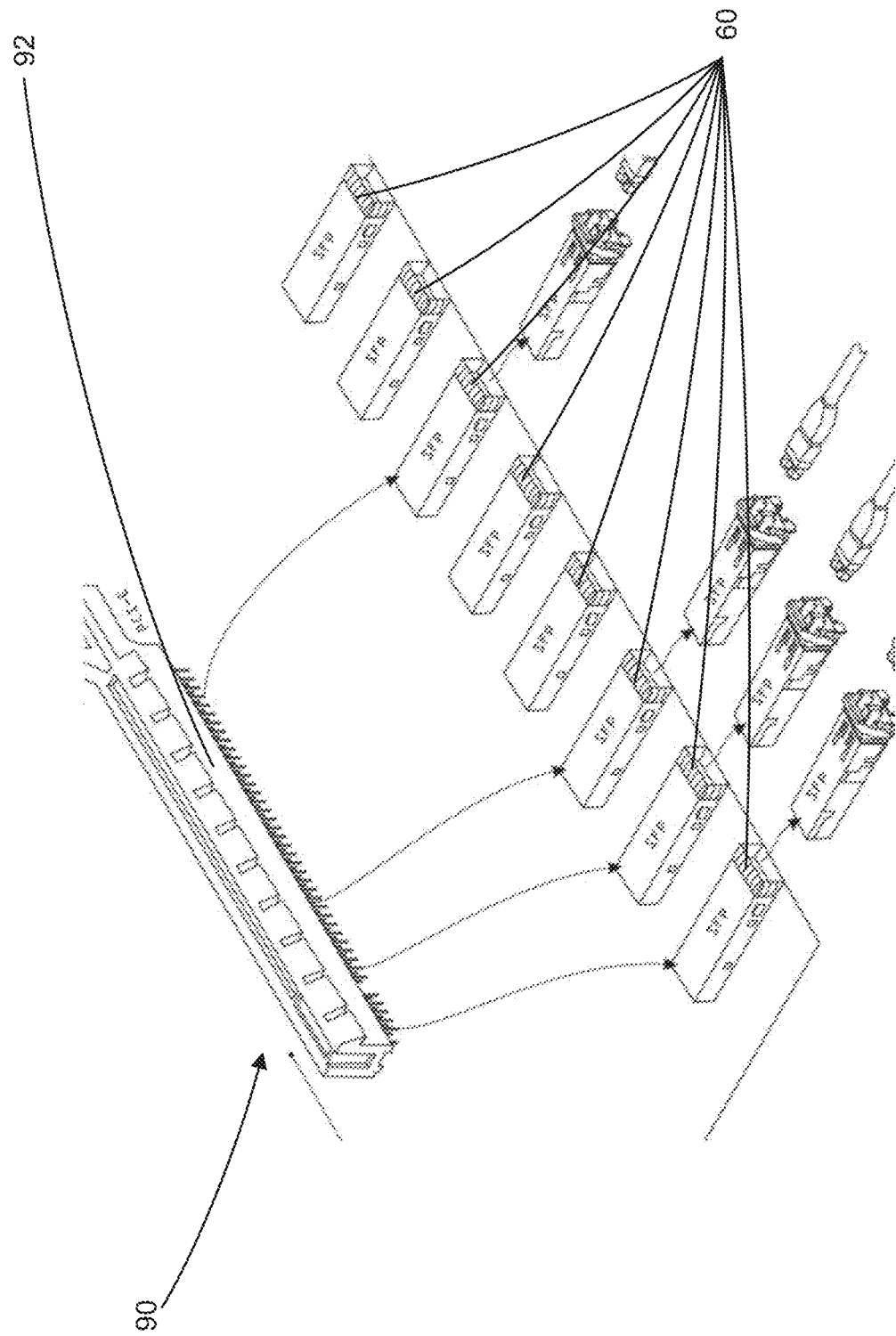
FIG. 5 is a perspective schematic view a section of a circuit board enclosure according to an aspect of the present invention.

As depicted in FIG. 5, the enclosure card receptacle 92 defines electronic coupling of the second kind 90, which may be connected to the external connection ports 60 by any means which provides electrical connections.

Terminating connectors 84 may be provided to couple the cabling 82 to the motherboard 32 of the data card enclosure. As depicted in FIGS. 1A and 1B, the motherboard 32 may comprise traces for providing electrical connections 70, which are provided to connect the terminating connections 84 to the external communications ports 60.

Figure 6:
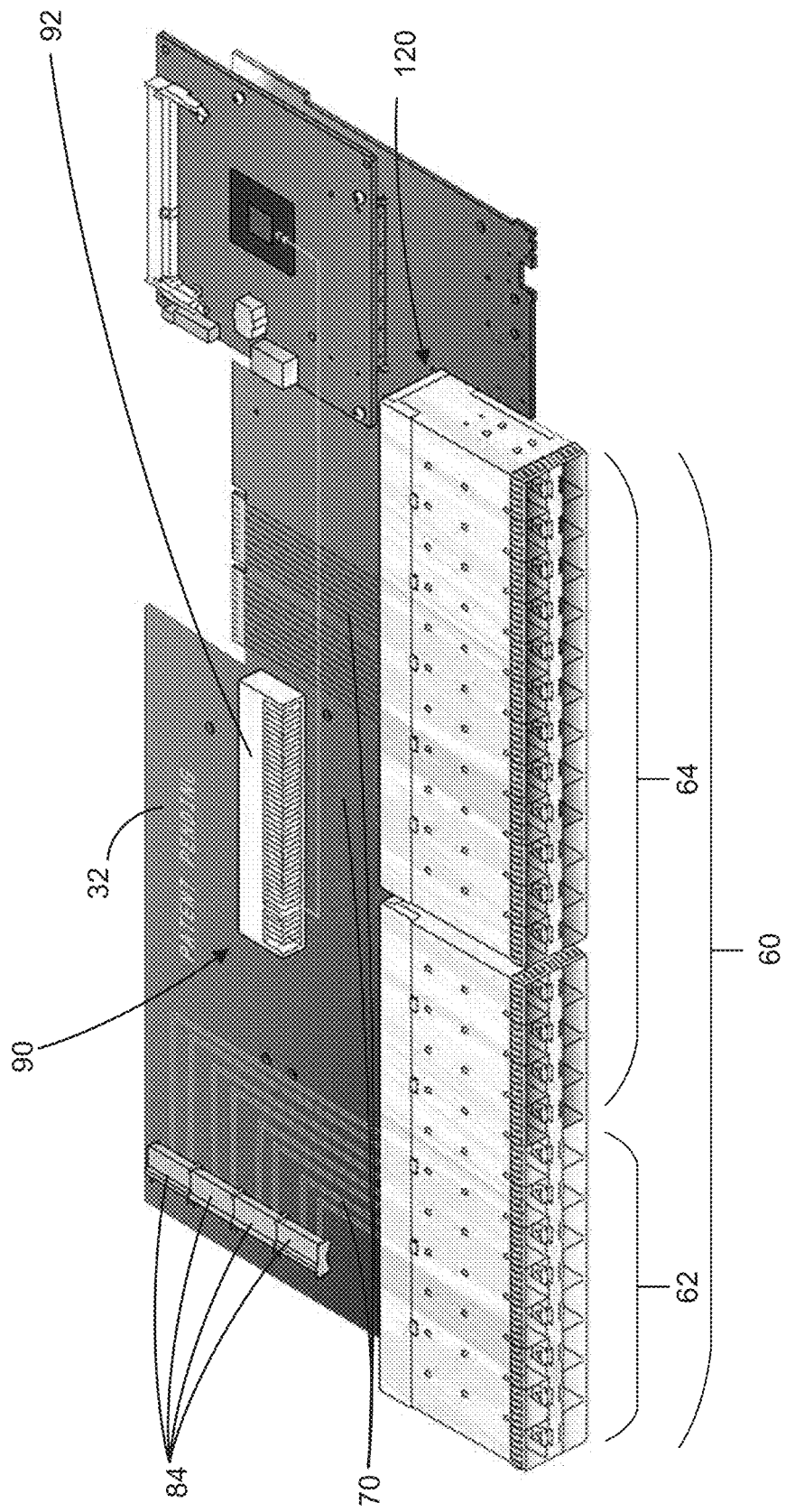
FIG. 6 is a perspective schematic view a section of a circuit board enclosure of FIG. 1A according to an aspect of the present invention.
Figure 7:
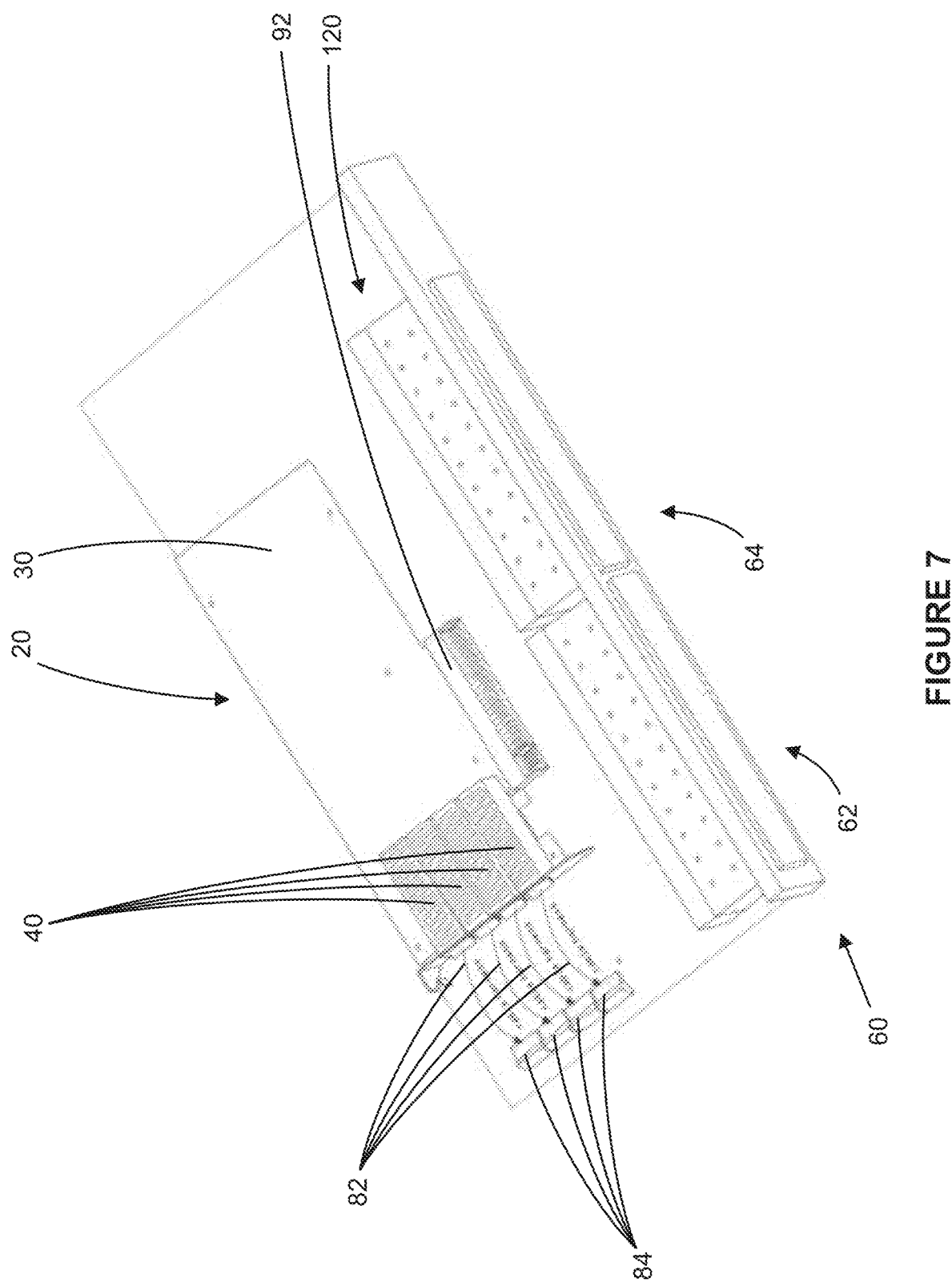
FIG. 7 is a perspective view a section of a circuit board enclosure of FIG. 1A according to an aspect of the present invention.

The second kind of electrical coupling 90 can be used to connect to the host interface connections. In the present example, the second kind of electrical coupling 90 may be an enclosure card receptacle 92. The enclosure card receptacle 92 can be provided to couple the host interface connections 50 to traces on the motherboard 32, such as those indicated at 70. The traces on the motherboard 32 are provided to connect the second kind of electronic coupling 90 to the external communications ports 60, so that the host interface connections may be accessible using the external communication ports 60. If the same data card being hosted by the enclosure was hosted, instead, by a computer or a rack server, the host interface connectors would generally be externally inaccessible (e.g. inaccessible to a device other than a server or computer). FIG. 6 provides a more detailed depiction of traces, such as those indicated at 70, provided on motherboard 32.

The second kind of electrical coupling may comprise Peripheral Component Interconnect Express interfaces to permit the data card to communicate with a data card host, such as the enclosure.

The host interface connectors 50 can comprise electrical contacts that project from a surface of an edge of the printed circuit board 30 to define data card edge connectors with a plurality of electronic contact surfaces (not shown) and a plurality of connector positioning surfaces (not shown), the latter being usable for aligning the data card to the an appropriate connector. The second kind of electrical couplings 90 include the enclosure card receptacle 92 comprise a plurality of complementary electronic contact surfaces (not shown) for contacting the plurality of electronic contact surfaces of the plurality of host interface connectors 50 when the host interface connectors 50 are received into the card receptacle 92. The data card enclosure housing 12 further includes a plurality of enclosure positioning surfaces (not shown) for contacting the plurality of connector positioning surfaces to align or position the plurality of host interface connectors 50 relative to the enclosure housing 12 such that the plurality of electronic contact surfaces of the plurality of host interface connectors 50 contact the matching electronic contact surfaces of the data card receptacle (i.e. the second plurality of electronic couplings 90).

In some embodiments the receptacle 92 belonging to the second kind of electronic couplings 90 establishes a Peripheral Component Interconnect (PCI) Express compliant interface for receiving a PCI Express compliant data card.

In some embodiments, the data card enclosure 10 further comprises a signal conditioning system. The signal conditioning system can be electrically coupled to the plurality of external communication ports for maintaining compliance of electrical signals within the plurality of electrical connections to a signaling standard. The signaling standard may specify at least the threshold signal amplitude and a signal to noise ratio that the signal conditioning system may be required to maintain.

The external communications ports 60 may be subdivided to comprise a first set of external communication ports 62 and a second set of external communication ports 64. For example, in some implementations, one subset may be able to operate at higher bit rates. For example, the first set of external communication ports 62 may be designated for connecting to QSFP interfaces or other high-speed serial data links that operate at up to 25.78 Gbps "25 G" Ethernet. The second set of external communication ports 64 may be able to operate at a maximum rate that is lower than the first set. For example the second set of external communication ports 64 may have a maximum bitrate of 10 Gbps. In other words, the first set of external communication ports 62 may be operable to communicate at a first maximum bit-rate that is greater than a second maximum bit-rate of the second set of external communication ports 64. In certain embodiments the first set of communication ports may be connected to a particular subset of the data card connectors 40, defined by a particular type of data card connector, such as QSFP connectors on a data card, if such connectors are available. In some other embodiments, all of the external communication ports 64 may operate at the same maximum bitrate. In yet other embodiments, the second set of external communication ports 64 may have a higher maximum bitrate compared to the first set of external communication ports 62.

In some embodiments the data card enclosure may further comprise a host data processor coupled to the plurality of external communication ports 60 and operable to monitor, for each external communication port in the plurality of external communication ports 60, a status of that external communication port, the status indicating at least i) a bit-rate of that external communication port; ii) at least one connector in the plurality of data card connectors and plurality of host interface connectors to which that external communication port is connected; and iii) a type of an external connector coupled to that external communication port.

In some embodiments, a host data processor can be provided on the main motherboard 32. In such embodiments, this host data processor may be computer-on-module (COM) Express Module, such as COM Express Module 110. In some embodiments the host data processor is a command line interface built into the enclosure, which may be accessed directly or through COM Express Module 110, which may together form the host data processor.

In other embodiments other host data processor components may be used. For example, an embedded controller may be provided, built into the enclosure motherboard. The embedded controller may operate as host data processor and may provide a user interface, such as a command line interface. In this embodiment, the COM Express Module may be an optional component. In other embodiments, the enclosure may be delivered to a user without the COM Express Module, or a COM Express Module may be delivered without a pre-installed Operating System (OS). The optional COM Express Module may operate in conjunction with the embedded controller to provide additional functionality for the enclosure. In one instance, a user may use the enclosure as a computer, by exploiting the availability of the COM Express Module. In other cases, if the data card has a FPGA or other programmable logic device or devices installed thereon, the COM Express Module may be a convenient way to perform device programming (e.g. FPGA development and configuration) and device trouble shooting, if the appropriate development tools are installed. Alternatively, depending on the configuration and availability of resources on the FPGA card, the FPGA can be accessed, for example, reconfigured via the host interface connectors such as the PCI Express ports. In other embodiments, FPGA configuration can be accomplished via the enclosure remotely via network access (e.g. Ethernet) or through special management ports such as out-of-band ports also provided on the enclosure operable for administering the enclosure, the data card or both.

The host data processor may be operable to provide a user interface for representing the plurality of external communication ports and for indicating, for each external communication port, the status of that external communication port to the user of the data card 20.

Reference is now made to FIGS. 10 to 14, which depict various interfaces and functions 150, 152, 154, 156, and 158 which may be available to a user of the data card enclosure. A user may be able to enter a number of device monitoring commands and other commands to obtain information or send instructions.

Figure 10:
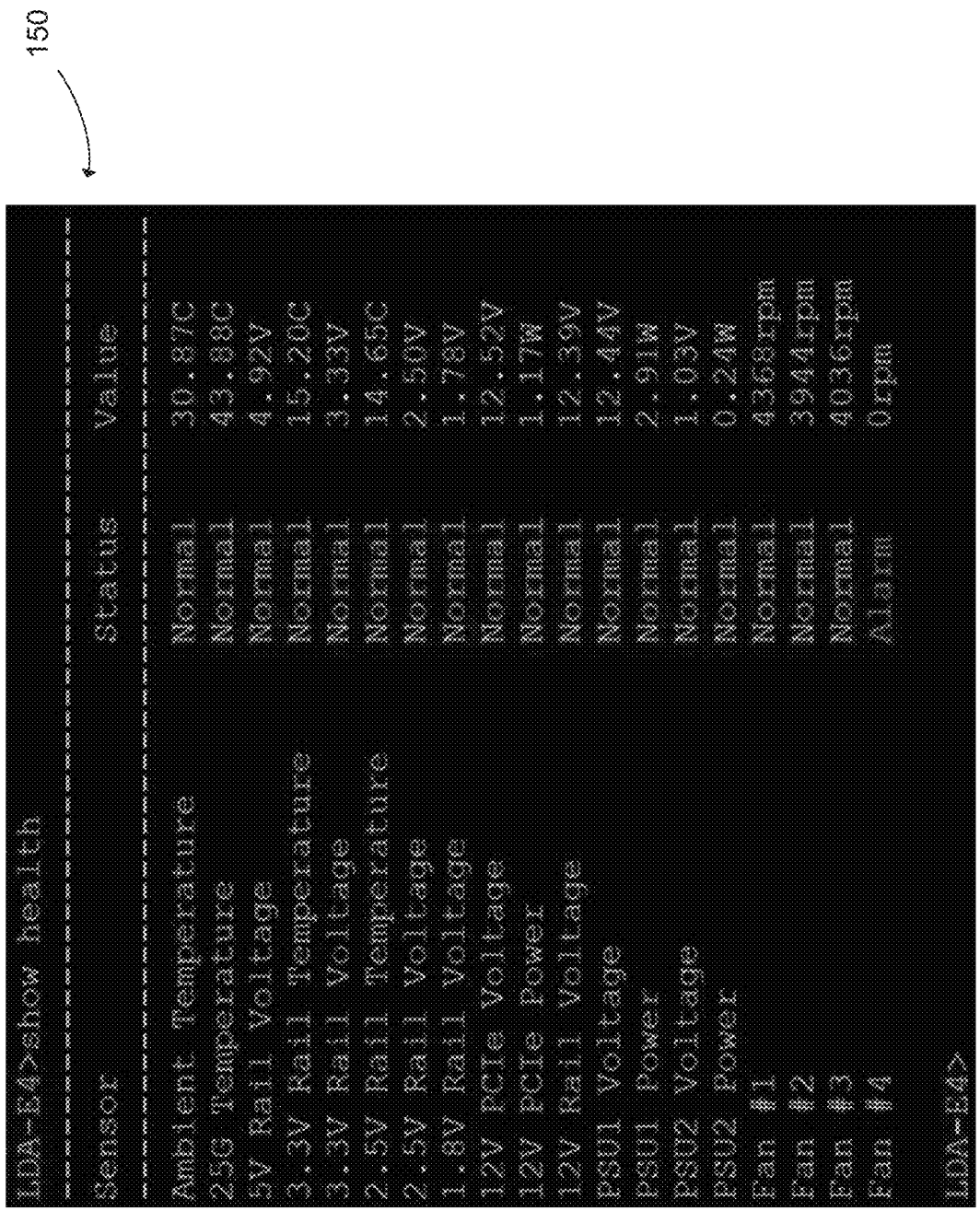
FIG. 10 is a depiction of a portion of a user interface according to an aspect of the present invention.

For example, FIG. 10 depicts an inquiry for current information from all device sensors such as voltage and power on vital rails, temperature on the key device parts, fan status, etc. As depicted in FIG. 10, the command "show health" can result in information indicating an alarm or alert if one or more of the monitored parameters is outside a defined acceptable operating range. As shown in FIG. 10, an alert is generated as a result of one of the fans being non-operational (e.g. spinning at 0 revolutions per minute (RPM)), and that all other sensors are indicating normal function.

Figure 11:
FIG. 11 is a depiction of a portion of a user interface according to an aspect of the present invention.

FIG. 11 depicts another inquiry made by a user, specifically for displaying system-level alerts. The command "show alerts" can be used to show a list of active alerts, and each alert can be provided with corresponding information. In the example shown, the active alerts indicate a disconnected fan and a disconnected internal timer battery.

Figure 12:
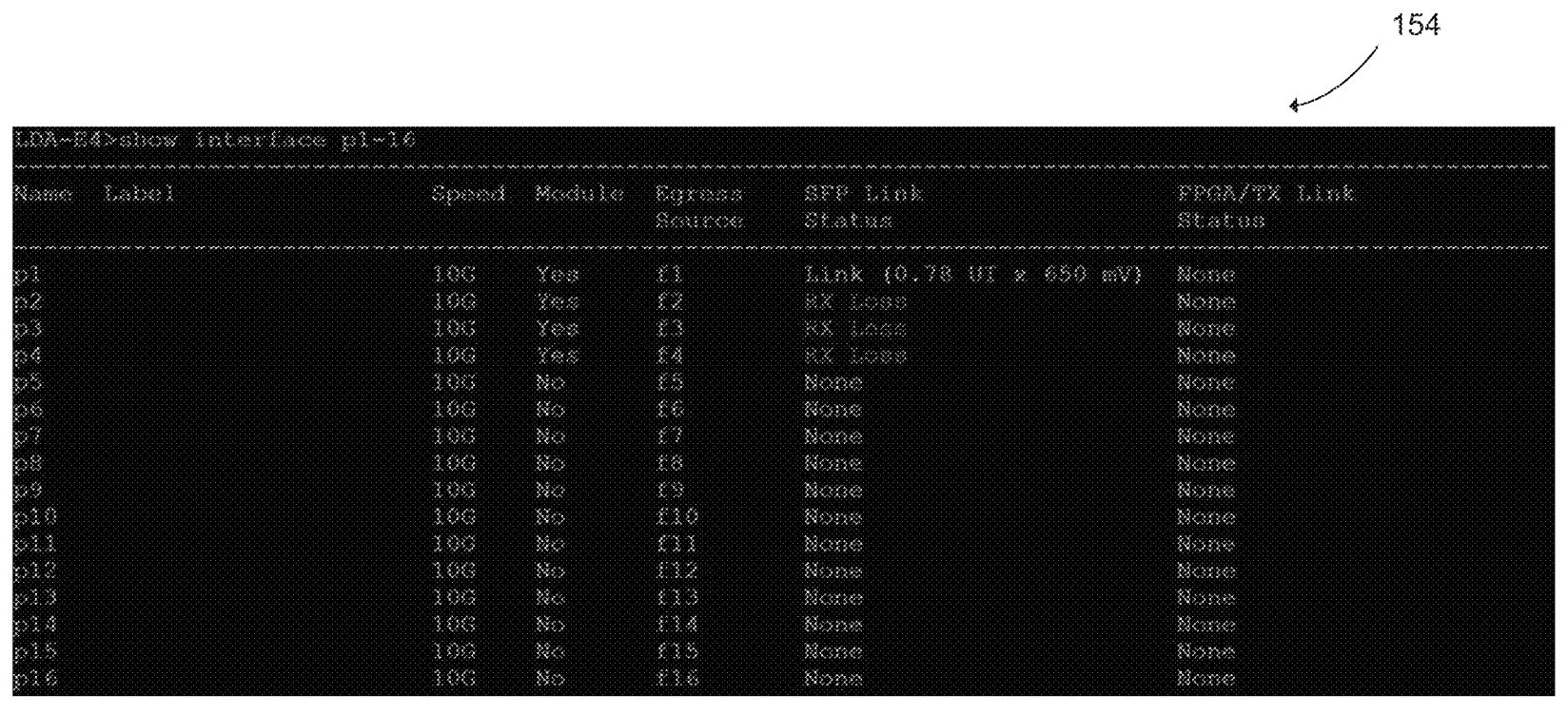

The user interface may also permit a user to obtain information about specific devices or components of the data card enclosure. For example, FIG. 12 depicts an inquiry as a result of a user entering the command "show interface p1-16" to obtain information concerning the status of external communication ports 1 to 16. The information presented in the interface is a listing of the external communication ports in question as indicated in the column "Name". The entry for port 1 is indicating that port 1 has an active link from the SFP side (i.e. an SFP transceiver is connected to port 1) as shown in the column entitled "SFP Link Status", with information concerning the quality of the signal's corresponding eye diagram reported (e.g. unit interval 0.78). SFP Link Statuses for entries corresponding to ports 2 through 4 indicate SFP modules being inserted, but an optical link is not established by indicating an RX Loss (Receive Loss) state. The remaining ports listed do not have SFP modules inserted as indicated in the "SFP Link Status". Lastly, in the present example, a data card, specifically an FPGA data card is not installed. As such, the column entitled "FPGA/TX Link Status" indicates an absence of a link (e.g. "None"). Where an FPGA or data card is installed, the destination port and link status can be indicated.

Figure 14:
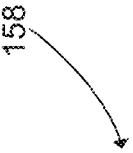
FIG. 14 is a depiction of a portion of a user interface according to an aspect of the present invention.

Many other specific inquires may also be made. For example, FIGS. 13 and 14 depict inquiries concerning transceiver information for ports 1 to 16. As depicted, information for ports 1 to 4 is returned, as ports 5 to 16 do not have transceivers inserted. The type, quantity, quality, and detail of information returned may be customized as required.

Commands may also be used to control various variables of the data card enclosure. For example, commands may be used to set the speed of selected ports, assign a source for outgoing signal of a selected port, power down or restart components of the data card enclosure, adjust the clock frequency for various components, etc.

In some embodiments, if the data card is a PCI Express-compliant FPGA card, the user interface may permit a user to send a command to the host data processor to trigger a power cycle to reset the data card. The data card may obtain operating power from a number of sources. For example, power may be provided through the PCI Express interface of the PCI Express-compliant card. The data card may alternatively have a power connector on the PCB for receiving power. In some other cases, the data card may be configured to accept power from both the PCI Express interface and an on-board power connector. For example, a command called "PCIe power-cycle" may be provided, and may power off the PCIe device connected to the enclosure (through which the data card may obtain power) for a short time (e.g. 3 seconds or another duration specified by the user) and then power it back on. The enclosure may detect how the power is being provided to the data card (e.g. via PCI Express, separate connectors or both) and control the power supply accordingly based on the manner in which power is provided to the data card. From a processor standpoint (i.e. the FPGA) this could be the same as a cold reboot even though the enclosure itself is not rebooted. This embodiment may allow reloading of FPGA firmware without rebooting the entire enclosure. Other commands may be available for PCI Express management, including a command to toggle a RESET signal used in the PCI Express standard. This command may be useful to reset Intellectual Property (IP) cores loaded into the FPGA without having to power off the data card receptacle (e.g. PCI Express interface). Furthermore, other commands may be provided to set PCI Express clock frequencies and specify the duration of reboots. These PCI Express management commands may provide control over the data card independent of the enclosure as a whole or the system or network in which an enclosure is connected, in particular the power-cycle may be able to power down and/or reboot the PCI Express compliant card independent of the device hosting the card. Rebooting or resetting the data card in this manner would generally not be possible if the card is hosted in a typical computer system such as a rack mounted computer, since power cycling the data card would also require power cycling the host computer.

The data card enclosure may further comprise a host data processor interface connector(s) 114 as shown in FIG. 8 provided on the exterior of the enclosure for the user of the data card 20 to communicate with the host data processor. However, in some embodiments, these connectors may be excluded or comprise different types of connectors. Such modifications may provide flexibility to the design of the enclosure.

In some embodiments the data card enclosure comprises external USB or display port interface and other ports to permit a user to attach interface apparatus such as a mouse, keyboard, or monitor, to use the enclosure alone. Such a configuration may be provided to enable ease of development and troubleshooting in various circumstances. For example, a user may use the interface to perform development and/or trouble shooting at the card-level (separate from the enclosure) or enclosure-level (separate from the data card) or both.

The data card enclosure may further comprise an air circulation system having at least one fan 102 to circulate air through the interior space of the enclosure 10. The air circulation system may have a temperature sensor (not shown) to measure a temperature value within the interior space occupied by the data card 20, each fan 102 being controllable by the host data processor to adjust a rotational speed of a set of fan blades of that fan based on the temperature value measured by the at least one temperature sensor and provided to the host data processor.

In some embodiments, the air circulation system may comprise a plurality of sensors distributed throughout at least the interior of the data card enclosure. Sensors may be distributed to monitor groups of external ports; alternatively a sensor may monitor each individual port. Sensors may also monitor other components of the data card enclosure, as indicated above.

In some embodiments the data card enclosure further comprises a switch fabric 120 coupled to the external communication ports 60 and the data card connectors 40 and host interface connectors 50. The switch fabric 120 is configurable by the host data processor 110 to map at least one connector in the plurality of data card connectors 40 and host interface connectors 50 to at least one external communication port by establishing an electronic communication pathway from the at least one connector in the plurality of data card connectors 40 and host interface connectors 50 to at least one external communication port using the plurality of electrical connections 70.

Figure 15:
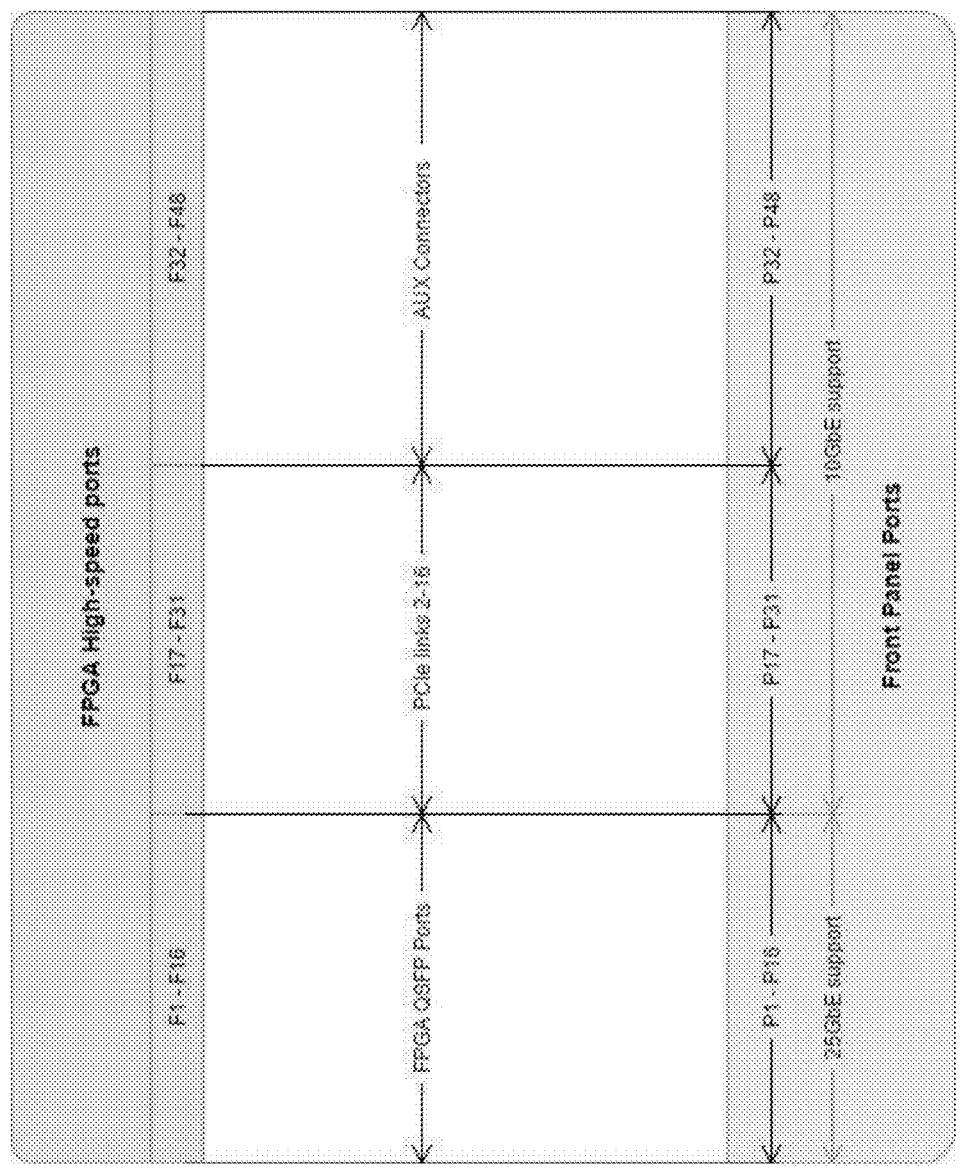
FIG. 15 is a schematic view of a port mapping architecture according to an aspect of the present invention.

As depicted in FIG. 15, in some embodiments various ports on a data card, such as QSFP ports, PCIe links and other auxiliary connectors such as USB, SATA, and SAS connectors, may be mapped to external communications ports on the front panel of a data card enclosure. In some default configurations each port of the data card may be given a designation, such as F1 to F48, while each external communication port may be given a designation, such as P1 to P48, and each F port may be routed to its counterparty P port with the same number, while data sent in the opposite direction will also conform to the same routing.

In some embodiments in which a first subset of the external communications ports operate at a different speed than a second subset, it may be advantageous to choose corresponding data card and user interface connections based on desired data transfer speeds.

In some embodiments the user interface may enable a user to reroute data along any route chosen. In some embodiments the switch fabric may be configurable to switch only between external communication ports. All switching may take place through the switch fabric.

In some embodiments the switch fabric 120 comprises a plurality of sub switch fabrics 122. Each sub switch fabric may operate independently of each other sub switch fabric and be operable to transfer electrical signals between a corresponding subset of external communication ports and a subset of connectors in the plurality of data card connectors 40 and plurality of host interface connectors 50. In some embodiments the switch fabric 120 may comprise at least a first switch fabric and a second switch fabric. In some embodiments, the first sub switch fabric may transfer data at a first maximum bit-rate that is greater than a second maximum bit rate of the second sub switch fabric.

Figure 16:
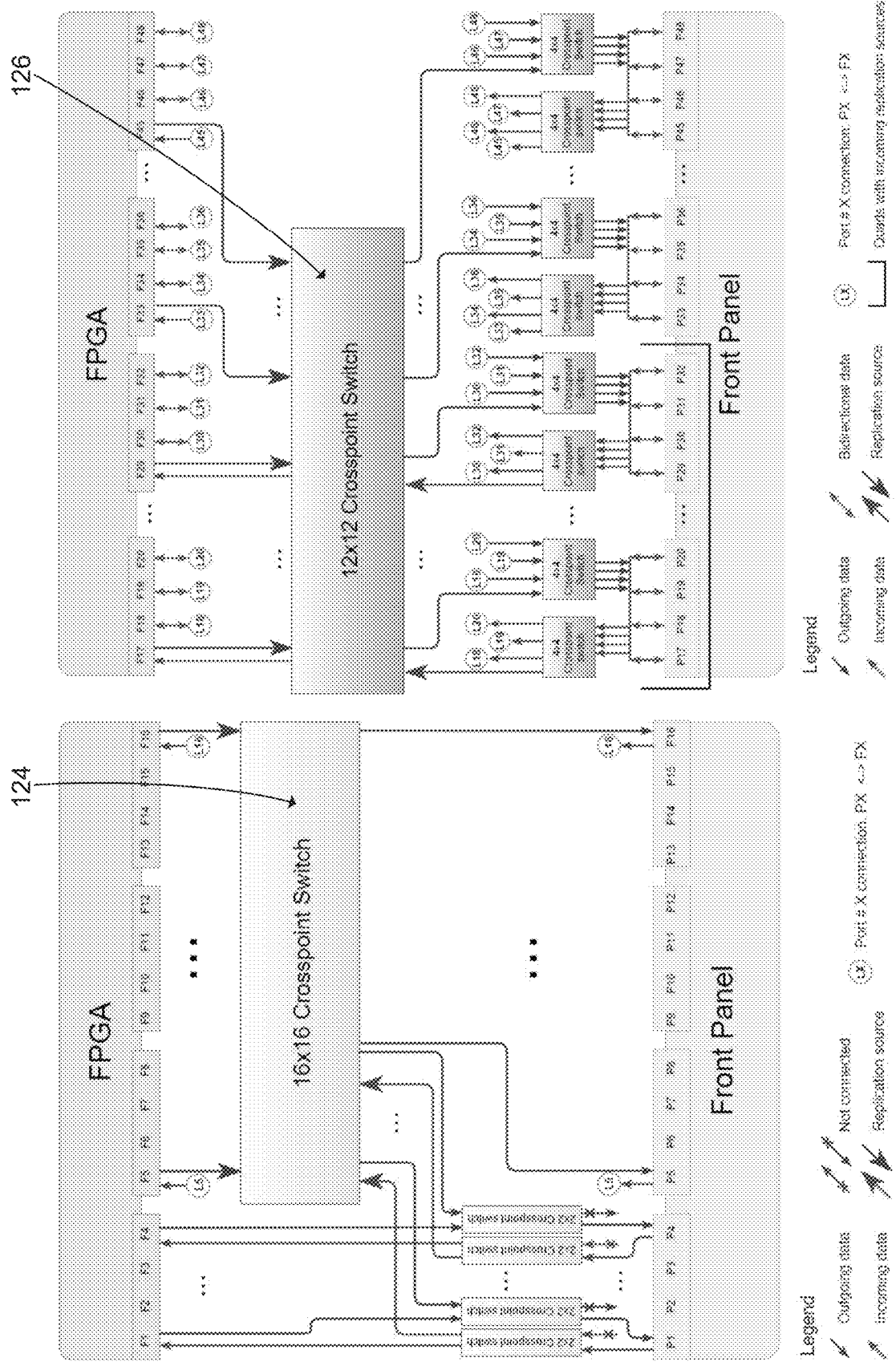
FIG. 16 is a schematic view of a port mapping architecture according to an aspect of the present invention.

For example, as depicted in FIG. 16, more complicated port mappings (e.g. customized port mappings) may replace the default one-to-one mapping described above. The switch fabric may comprise a first sub switch fabric and a second sub switch fabric. Each fabric may use one primary and several smaller crosspoint switches.

In some embodiments, as depicted in FIG. 16, the first sub switch fabric is served by one primary 16×16 crosspoint switch 124 aided by multiple 2×2 crosspoint switches. This architecture may be provided with replication rules, which may determine the number of external communication ports set as replication sources. For example, where the ports are 25 Gbps ports, the replication rules may allow four independent 25 Gbps external sources, two 50 Gbps external sources, or one 100 Gbps external source.

In some embodiments, as depicted in FIG. 16, the second sub switch fabric can be served by primary 12×12 crosspoint switch 126 aided by multiple 4×4 crosspoint switches. A quad-based architecture may set additional rules on replication, which may determine the number of external communication ports set as replication sources. As depicted in FIG. 16, in some embodiments, the sub switching fabrics may be substantially independent.

As depicted in FIG. 8, the front of a data card enclosure may comprise a plurality of ports, which may include external communications ports 60, and various alternative ports 114. As mentioned above, the alternative ports may be provided to facilitate a variety of interface and interaction functions between a user and the data card or other components of the data card enclosure.

In some embodiments custom cabling may be used to connect data card connections or host interface connections to traces on a motherboard or other electrical connections to the external communications ports. Custom cable may include various terminals to mate with various data card connectors.

Figure 9:
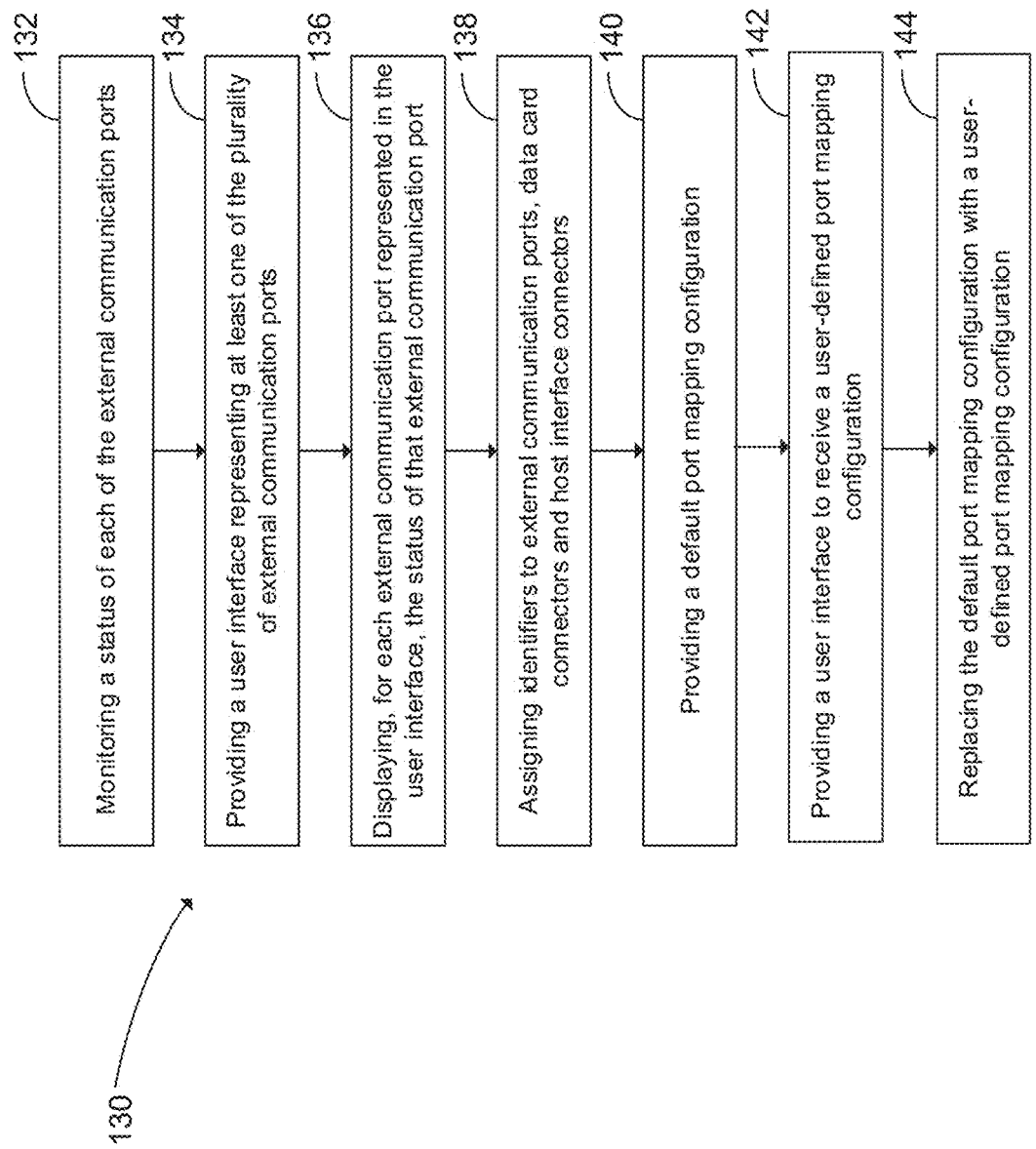
FIG. 9 is a flow chart of a method of using a data card enclosure according to an aspect of the present invention.

Reference is now made to FIG. 9. An example method 130 of using the data card enclosure is provided. The steps may comprise monitoring the status of each of the external communication ports 132. The method may further comprise providing 134 a user interface representing at least one of the plurality of external communication ports, and displaying 136, for each external communication port represented in the user interface, the status of that external communication port.

The method 130 may further comprise assigning 138 an external communication port identifier to each external communication port in the plurality of external communication ports 60, assigning a data card connector identifier to each data card connector and host interface connector. For example, all the external communication ports may be provided with a prefix "p" such that the first port may be assigned an identifier "p1". If there are 48 external communication ports, the last port may be given the identifier "p48". The data card connectors on the data card may be given a prefix "f" and a first port may be assigned the identifier "f1", and subsequent connectors "f2" and so on until all data card connectors have been assigned an identifier. Using these identifiers, the method may further comprise providing a default port mapping configuration 140 specifying pairings based on the assigned data card connector identifiers with external communication port identifiers and establishing an electronic communications pathway between paired external communications ports and data card connections and host interface connections.

A user may use a user interface provided to receive a user-defined port mapping 142, to specify a user-defined port mapping configuration 144. The user-defined port mapping configuration may specify pairings based on the assigned data card connector identifiers and external communication port identifiers (i.e. the connections between ports and connectors are modified and not their respective identifiers). The user-defined port mapping configuration may replace the default port mapping configuration and may specify the establishment of at least one customized port mapping that defines a user-defined electronic communication pathway from a user-selected connector in the plurality of data card connectors and host interface connectors to a user-selected external communication port using an electrical connection in the plurality of electrical connections. This user-defined port mapping configuration permits a user to customize which of the external communications ports are electronically coupled to which of the internal data card connections and host interface connections.

The method may further comprise determining an interface standard with which the host interface connectors of the data card are compliant and providing a compatible data card receptacle for receiving the plurality of host interface connectors within the enclosure.

The method may permit a user to communicate with a data card processor of the data card 20. While the steps in the method are numbered, these steps may be performed in any appropriate sequence and embodiments of the invention are not restricted to the progression provided herein. For example, user-defined port mapping may be established first, and subsequently be replaced with a default mapping. Alternatively, The monitoring may proceed after port mapping is performed.

The present invention has been described here by way of example only. Various modification and variations may be made to these exemplary embodiments and aspects without departing from the spirit and scope of the invention, which is limited only by the appended claim.

The invention claimed is:

1. A data card enclosure system for hosting a data card, the data card having a printed circuit board with a plurality of data card connectors and a plurality of host interface connectors disposed thereon, wherein the plurality of host interface connectors are configured to interface with an internal data bus of a host computer system to transfer data between the data card and host computer system, the data card enclosure system comprising:

an enclosure housing defining an interior space for housing the data card;

a plurality of external communication ports on an exterior of the enclosure, such that the plurality of external communication ports is accessible by a user of the data card without accessing the interior space of the enclosure and the data card housed therein; and a plurality of electrical connections for connecting the plurality of data card connectors and the plurality of host interface connectors to the plurality of external communication ports, the plurality of electrical connections comprising a first plurality of electronic couplings of a first kind of electronic coupling for connecting to the plurality of data card connectors, and a second plurality of electronic couplings of a second kind of electronic coupling for connecting to the plurality of host interface connectors, the first kind of electronic coupling being different from the second kind of electronic coupling.

2. The data card enclosure system as defined in claim 1 wherein the plurality of host interface connectors project from a surface of an edge of the printed circuit board, to define data card edge connectors with a plurality of electronic contact surfaces and a plurality of connector positioning surfaces;

the enclosure housing comprises at least one card receptacle for receiving the plurality of host interface connectors, the at least one card receptacle comprising the second plurality of electronic couplings of the second kind of electronic coupling, the second plurality of electronic couplings comprising a plurality of matching electronic contact surfaces for contacting the plurality of electronic contact surfaces of the plurality of host interface connectors when the plurality of host interface connectors is received into the at least one card receptacle; and the enclosure housing further comprises a plurality of enclosure positioning surfaces for contacting the plurality of connector positioning surfaces to position the plurality of host interface connectors relative to the enclosure housing such that the plurality of electronic contact surfaces of the plurality of host interface connectors contact the matching electronic contact surfaces of the second plurality of electronic couplings.

3. The data card enclosure system as defined in claim 2 wherein the first plurality of electronic couplings is configured to be releasably attachable to the plurality of data card connectors; and the plurality of electrical connections comprises a plurality of electrical cables, each cable in the plurality of electrical cables having at least one corresponding electronic coupling in the first plurality of electronic couplings for coupling that cable to at least one corresponding connector in the plurality of data card connectors.

4. The data card enclosure system as defined in claim 2, wherein the receptacle comprising the second plurality of electronic couplings of the second kind of electronic coupling and enclosure positioning surfaces establishes a PCI Express-compliant interface for receiving a PCI Express-compliant data card.

5. The data card enclosure system as defined in claim 1 further comprising a signal conditioning system, the signal conditioning system being electrically coupled to the plurality of external communication ports for maintaining compliance of electrical signals within the plurality of electrical connections to a signalling standard, the signalling standard specifying at least a threshold signal amplitude and a signal to noise ratio.

6. The data card enclosure system as defined in claim 1, wherein the plurality of external communication ports comprises a first set of external communication ports and a second set of external communication ports, the first set of external communication ports being operable to communicate at a first maximum bit-rate that is greater than a second maximum bit-rate of the second set of external communication ports.

7. The data card enclosure system as defined in claim 1 further comprising a host data processor coupled to the plurality of external communication ports and operable to monitor, for each external communication port in the plurality of external communication ports, a status of that external communication port, the status indicating at least i) a bit-rate of that external communication port; ii) at least one connector in the plurality of data card connectors and plurality of host interface connectors to which that external communication port is connected; and iii) a type of an external connector coupled to that external communication port.

8. The data card enclosure as defined in claim 7, wherein the host data processor is further operable to provide a user interface for representing the plurality of external communication ports and for indicating, for each external communication port, the status of that external communication port to the user of the data card.

9. The data card enclosure as defined in claim 7 further comprising at least one host data processor interface connector provided on the exterior of the enclosure for the user of the data card to communicate with the host data processor.

10. The data card enclosure as defined in claim 7 further comprising an air circulation system having at least one fan to circulate air through the interior space of the enclosure and temperature sensor to measure a temperature value within the interior space occupied by the data card, each fan being controllable by the host data processor to adjust a rotational speed of a set of fan blades of that fan based on the temperature value measured by the at least one temperature sensor and provided to the host data processor.

11. The data card enclosure as defined in claim 7, further comprising at least one switch fabric coupled to the plurality of external communication ports and the plurality of data card connectors and host interface connectors, the switch fabric being configurable by the host data processor to map at least one connector in the plurality of data card connectors and host interface connectors to at least one external communication port by establishing an electronic communication pathway from the at least one connector in the plurality of data card connectors and host interface connectors to at least one external communication port using the plurality of electrical connections.

12. The data card enclosure as defined in claim 11, wherein the at least one switch fabric comprises a plurality of sub switch fabrics, each sub switch fabric operates independently of each other sub switch fabric and is operable to transfer electrical signals between a corresponding subset of external communication ports and a subset of connectors in the plurality of data card connectors and plurality of host interface connectors.

13. The data card enclosure of claim 12, wherein a first switch fabric is operable to transfer data at a first maximum bit-rate that is greater than a second maximum bit-rate of a second sub switch fabric.

14. The data card enclosure system as defined in claim 1 further comprising the data card having the printed circuit board with the plurality of data card connectors and the plurality of host interface connectors disposed thereon housed within the interior space defined by the enclosure housing, wherein the plurality of electrical connections are connected to the plurality of data card connectors and to the plurality of host interface connectors, the plurality of electrical connections being connected to the plurality of data card connectors by the first plurality of electronic couplings and to the plurality of host interface connectors by the second plurality of electronic couplings, to transfer data between the data card and the plurality of external communication ports via the plurality of electrical connections.

15. A method of using a data card including a printed circuit board, the method comprising:
providing the data card, the data card having a plurality of communication ports available on the data card, wherein, the plurality of communication ports are disposed on the printed circuit board of the data card and comprise a plurality of data card connectors and a plurality of host interface connectors, the plurality of host interface connectors being configured to interface with an internal data bus of a host computer system to transfer data between the data card and the host computer system;
providing an enclosure housing defining an interior space for housing the data card;
providing a plurality of external communication ports on an exterior of the enclosure, such that the plurality of external communication ports is accessible by a user of the data card without accessing the interior space of the enclosure and the data card housed therein; and,
providing a plurality of electrical connections in the enclosure by, for each communication port in the plurality of communication ports, providing a corresponding electrical connection in the plurality of electrical connections for connecting that communication port to a corresponding external communication port on the exterior of the enclosure.

16. The method of claim 15 further comprising:
monitoring a status of each of the external communication ports, the status indicating at least i) a bit-rate of that external communication port; ii) at least one connector identifier identifying at least one connector in the plurality of data card connectors and plurality of host interface connectors to which that external communication port is connected; and iii) a type of an external connector coupled to that external communication port;
providing a user interface representing at least one of the plurality of external communication ports; and
displaying, for each external communication port represented in the user interface, the status of that external communication port.

17. The method of claim 15 further comprising:
assigning, to each external communication port in the plurality of external communication ports, an external communication port identifier;
assigning, to each connector in the plurality of data card connectors and plurality of host interface connectors, a data card connector identifier; and
providing a default port mapping configuration, the default port mapping configuration specifies, using assigned data card connector identifiers and external communication port identifiers, establishment of an electronic communication pathway from a connector in the plurality of data card connectors and host interface connectors to an external communication port using an electrical connection in the plurality of electrical connections, in which respective identifiers of the connector and the external communication port are paired based on a default mapping.

18. The method of claim 17, further comprising operating a host data processor to provide a user interface to receive at least one input from a user of the data card to specify a user-defined port mapping configuration, the user-defined port mapping configuration replaces the default port mapping configuration and specifies, using the assigned data card connector identifiers and external communication port identifiers, establishment of at least one customized port mappings that define user-defined electronic communication pathway from a user-selected connector in the plurality of data card connectors and host interface connectors to a user-selected external communication port using an electrical connection in the plurality of electrical connections in which respective identifiers of the user-selected connector and user-selected port are different from port mappings associated with the default port mapping configuration.

19. The method of claim 15 further comprising determining an interface standard with which the host interface connectors of the data card are compliant and providing a compatible data card receptacle for receiving the plurality of host interface connectors within the enclosure.

20. The method of claim 15 further comprises communicating with a data card processor of the data card housed in the interior space of the enclosure by sending and receiving electrical signals using the plurality of external communication ports, the electrical signals being propagated along the plurality of electrical connections, and the plurality of host interface connectors and plurality of data card connectors to the data card.

* * * * *